(12) United States Patent
Mack

(10) Patent No.: US 7,644,931 B2
(45) Date of Patent: Jan. 12, 2010

(54) DRILL CHUCK WITH ADJUSTMENT-SLEEVE LOCK

(75) Inventor: Hans-Dieter Mack, Sontheim (DE)

(73) Assignee: Rohm GmbH, Sontheim (DE)

( * ) Notice: Subject to any disclaimer, the term of this patent is extended or adjusted under 35 U.S.C. 154(b) by 504 days.

(21) Appl. No.: 11/352,061

(22) Filed: Feb. 10, 2006

(65) Prior Publication Data

US 2006/0192351 A1 Aug. 31, 2006

(30) Foreign Application Priority Data

Feb. 14, 2005 (DE) .................... 10 2005 006 780

(51) Int. Cl.
*B23B 31/163* (2006.01)
(52) U.S. Cl. .................. 279/62; 279/140; 279/157; 279/902
(58) Field of Classification Search .............. 279/60, 279/61, 62, 134, 140, 157, 902; *B23B 31/16*
See application file for complete search history.

(56) References Cited

U.S. PATENT DOCUMENTS

| | | | | | |
|---|---|---|---|---|---|
| 4,272,087 | A | * | 6/1981 | Rohm | 279/62 |
| 4,317,578 | A | * | 3/1982 | Welch | 279/60 |
| 5,236,206 | A | * | 8/1993 | Rohm | 279/63 |
| 5,435,578 | A | * | 7/1995 | Rohm | 279/62 |
| 5,464,230 | A | * | 11/1995 | Rohm | 279/63 |
| 5,624,125 | A | * | 4/1997 | Rohm | 279/62 |
| 5,653,561 | A | * | 8/1997 | May | 408/67 |
| 7,156,402 | B2 | * | 1/2007 | Mack | 279/60 |
| 2006/0284386 | A1 | * | 12/2006 | Mack | 279/60 |
| 2007/0235951 | A1 | * | 10/2007 | Mack | 279/60 |
| 2007/0273109 | A1 | * | 11/2007 | Mack et al. | 279/140 |
| 2009/0058019 | A1 | * | 3/2009 | Mack | 279/114 |

FOREIGN PATENT DOCUMENTS

EP 0 716 896 6/1996

OTHER PUBLICATIONS

"Webster's On-line Dictionary", retrieved Nov. 3, 2008 from http://www.merriam-webster.com/dictionary/spring[2].).*

* cited by examiner

*Primary Examiner*—Eric A Gates
(74) *Attorney, Agent, or Firm*—Andrew Wilford

(57) ABSTRACT

A chuck has a drive shaft, a generally rotatable housing part adjacent the drive shaft, and a chuck body fixed to and rotatable with the shaft and formed with a plurality of guides holding respective jaws shiftable between closely spaced inner positions and widely spaced outer positions. An adjustment sleeve surrounding the body and coupled to the jaws can rotate relative to the body to shift the jaws between their positions. A latch has interengaging formations on the housing part and on the adjustment sleeve manually shiftable between a coupled position for rotationally locking the adjustment sleeve to the housing part and a decoupled position for rotation of the adjustment sleeve relative to the housing part. A torque coupler connected to the latch decouples the latch from the housing when, in the coupled position, a torque exerted between the housing and the chuck body exceeds a predetermined limit.

14 Claims, 4 Drawing Sheets

DRILL CHUCK WITH ADJUSTMENT-SLEEVE LOCK

FIELD OF THE INVENTION

The present invention relates to a chuck. More particularly this invention concerns a chuck for a reversible power drill.

BACKGROUND OF THE INVENTION

A typical chuck comprises a drive shaft extending along and rotatable about an axis, a housing part adjacent the drive shaft and generally nonrotatable about the axis, and a chuck body fixed to and rotatable with the shaft and formed with a plurality of guides. Respective jaws are shiftable in the guides between closely spaced inner positions and widely spaced outer positions. An adjustment sleeve surrounding the body and coupled to the jaws can be rotated about the axis relative to the body to shift the jaws between their positions.

In the oldest systems, it is standard to form the chuck body adjacent a toothed front edge of the adjustment sleeve with a plurality of radially open pilot holes. A stem of a geared chuck key is inserted in one of the holes and the gear is fitted to the adjustment-sleeve teeth, so that rotation of the key relatively shifts the adjustment sleeve and chuck body. This way considerable torque can be brought to bear both to chuck and dechuck a tool. It is, however, a fairly laborious operation to move the jaws radially between a widely spread and a closely spaced position. Furthermore the chuck key can get lost, and if it is accidentally left in the chuck when the drill is started, it is sent flying and can get lost or injure the user.

In another system the chuck key is dispensed with and the adjustment sleeve is made fairly large so that the user can get a solid grip on it. Either a spindle lock is provided, so that the chuck body can be arrested and the user can manually tighten and loosen the chuck, or the user grips the adjustment sleeve and rotates the chuck body using the drill's motor for chucking and dechucking a tool. Either way the user must exert considerable force, especially with a self-tightening chuck after a drilling operation when the tool can be solidly wedged in place.

EP 0,716,896 describes a system where mechanism is provided to arrest the adjustment sleeve relative to the chuck body. To this end a coupling sleeve is shiftable between a pair of end positions, in one of which the adjustment sleeve is locked to the chuck body and in the other of which it can rotate freely relative to the chuck body. This makes it quite inconvenient when a large-diameter tool is being switch with a small-diameter tool, as the user must hold the tool in place with one hand while manipulating the chuck and operating the drill with the other.

OBJECTS OF THE INVENTION

It is therefore an object of the present invention to provide an improved drill chuck.

Another object is the provision of such an improved drill chuck that overcomes the above-given disadvantages, in particular that is easy to operate, in particular when switching between small- and large-diameter tools.

SUMMARY OF THE INVENTION

A chuck has according to the invention a drive shaft extending along and rotatable about an axis, a housing part adjacent the drive shaft and generally nonrotatable about the axis, and a chuck body fixed to and rotatable with the shaft and formed with a plurality of guides holding respective jaws shiftable between closely spaced inner positions and widely spaced outer positions. An adjustment sleeve surrounding the body and coupled to the jaws can rotate about the axis relative to the body to shift the jaws between their positions. A latch has interengaging formations on the housing part and on the adjustment sleeve manually shiftable between a coupled position for rotationally locking the adjustment sleeve to the housing part and a decoupled position for rotation about the axis of the adjustment sleeve relative to the housing part. A torque coupler connected to the latch decouples the latch from the housing when, in the coupled position, a torque exerted between the housing and the chuck body exceeds a predetermined limit.

This structure has the advantage that it is possible to operate the chuck manually simply by gripping and turning the adjustment sleeve to move the jaws in or out, or to use the drill's motor to do this job. Ideally, the adjustment sleeve can be spun down with one hand while the user holds the bit in position with the other. Once the jaws are gripping the new tool enough to hold it, the latch is operated so the motor can be used for the final tightening. Contrarily, the motor can be used for the initial loosening of the chuck, then the adjustment sleeve can be spun back by hand to open the chuck wide if necessary. The torque decoupler will ensure that the chuck is not overtightened.

The chuck body according to the invention is formed with an array of angled guides each holding a respective one of the jaws. Each jaw has an outer edge formed with a plurality of teeth. The adjustment sleeve includes a ring having an internal screwthread meshing with the jaw teeth.

The interengaging formations in accordance with the invention include a seat fixed relative to the adjustment sleeve and a coupling element movable relative to the housing part. Normally the adjustment sleeve is formed with an array of such seats distributed angularly about the axis, ensuring rapid latching. In addition there are two such coupling elements angularly spaced about the axis, typically diametrically opposite each other. Thus the chuck according to the invention can be used on a conventional drill and has most of the same parts as a standard chuck.

Each of the coupling elements is a radially shiftable button. The chuck further has according to the invention a spring urging the buttons radially outward into a position disengaged from the seats. This spring is a single arcuate leaf spring engaged around the adjustment sleeve and bearing radially outward on both of the buttons. It is rotationally fixed to the buttons and is formed at each button with a radially inwardly directed bump fittable in the seats and constituting the coupling formation. Such a structure is extremely simple and reliable.

Furthermore according to the invention a coupling sleeve carrying the buttons surrounds the spring. The torque decoupler is connected between the coupling sleeve and the housing. To this end the coupling sleeve and housing part have axially confronting faces, although the faces on the housing part could be formed by an insert set in the housing. The coupler includes a plurality of coupling bodies rotationally fixed to one of the faces, respective axially open seats on the other of the faces partially receiving the coupling bodies, and a spring urging the coupling sleeve axially toward the housing part. Thus when the predetermined torque limit is exceeded the bodies are cammed out of the respective seats and the coupling sleeve and housing part can rotate about the axis relative to each other. These seats according to the invention have flat flanks. More particularly the flanks of each seat extend at different angles to a plane perpendicular to the axis so that the predetermined torque limit is different depending on its rotational sense. This way the torque threshold at which the decoupler slips can be higher for dechucking a tool than for chucking on. Such a coupling is extremely compact, yet can be counted on to react accurately.

The chuck further has according to the invention a shield sleeve projecting axially outward from the housing and radially surrounding all but an end portion of the adjustment sleeve and chuck body. This shield sleeve is shiftable axially between an outer position out of contact with the adjustment sleeve and an inner position engaging the adjustment sleeve. A spring urges the shield sleeve into the outer position. This shield sleeve is rotatable about the axis relative to the housing.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
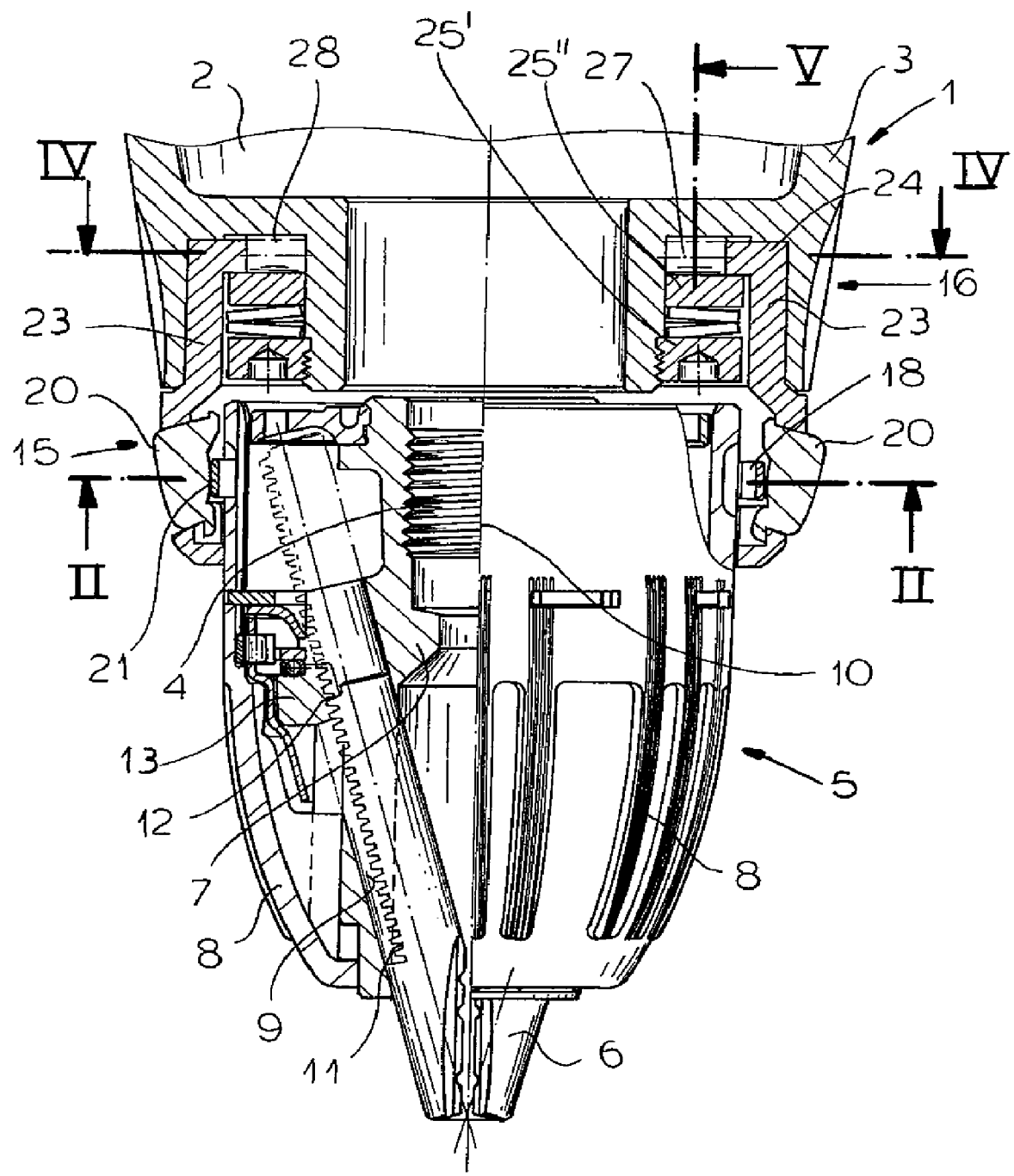
FIG. 1 is an axial section through a drill and chuck according to the invention.
Figure 2:
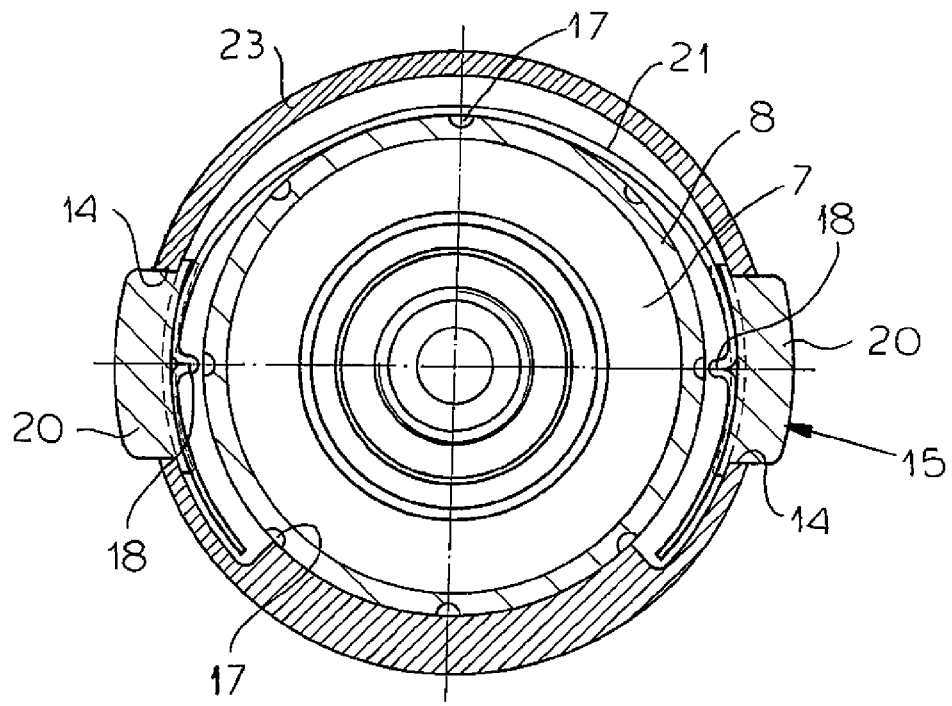
FIG. 2 is a section taken along line II-II of FIG. 1 showing the decoupled position.
Figure 3:
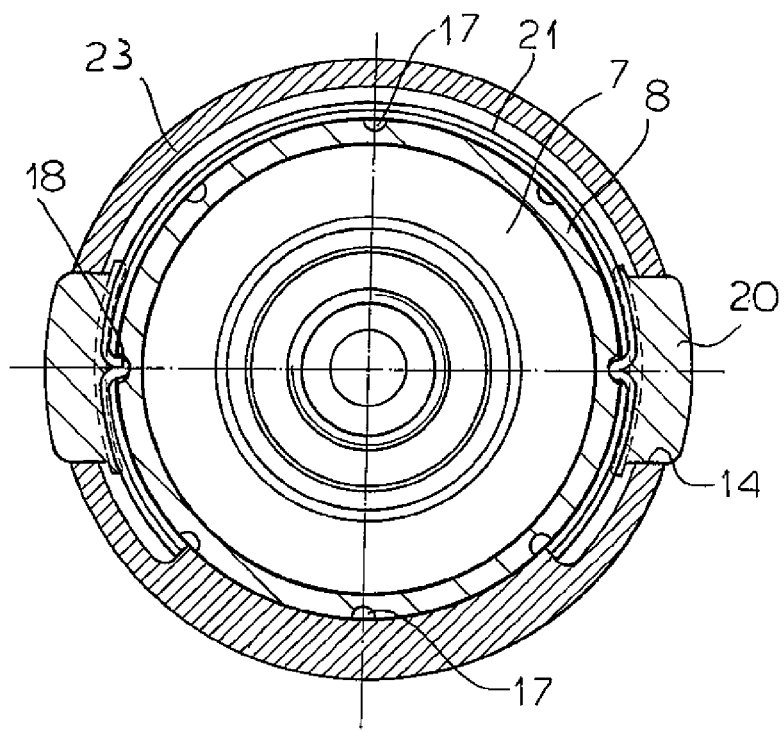
FIG. 3 is a view like FIG. 1 of the chuck in the coupled position.

As seen in FIGS. 1-5 a power drill 1 has a power unit 2 with a housing collar 3 from which projects a shaft shown partially at 4 and rotatable by an unillustrated motor in the housing 3 about an axis 10. A chuck 5 carried on the housing 3 and shaft 4 comprises a chuck body 7 fixed to the shaft 4 and formed with a plurality of guides 9 in which jaws 6 can move axially forward and radially inward, and axially rearward and radially outward. Teeth 11 on radially outwardly directed edges of the jaws 6 mesh with an internal screwthread 12 of a ring 13 that can be rotated to synchronously move the jaws 6 inward and outward. An adjustment sleeve 8 coaxially and concentrically surrounding the ring 13 and extending axially forward and rearward past it is rotationally coupled to this ring 13 so that it can be manually rotated and used to grip the jaws 6 on an unillustrated tool and to release them from the tool. Thus relative rotation between the adjustment sleeve 8 and the chuck body 7 radially and axially shifts the jaws 6.

A latch 15 can lock the adjustment sleeve 8 relative to the housing collar 3. This latch 15 has a pair of diametrally opposite buttons 20 fitted in respective radially throughgoing apertures 14 of a sleeve 23 connected through a below-described coupling 16 with the housing collar 3. These buttons 20 are urged radially outward by ends of a leaf spring 21 formed under each button 20 with a projection or bump 18 engageable in any of eight angularly equispaced and radially outwardly open seats 17 formed in the adjustment sleeve 8. When pushed in, therefore, these buttons 20 force the bumps 18 radially inward to engage in the seats 17 and rotationally arrest the sleeve 8 relative to the housing 3.

Figure 4:
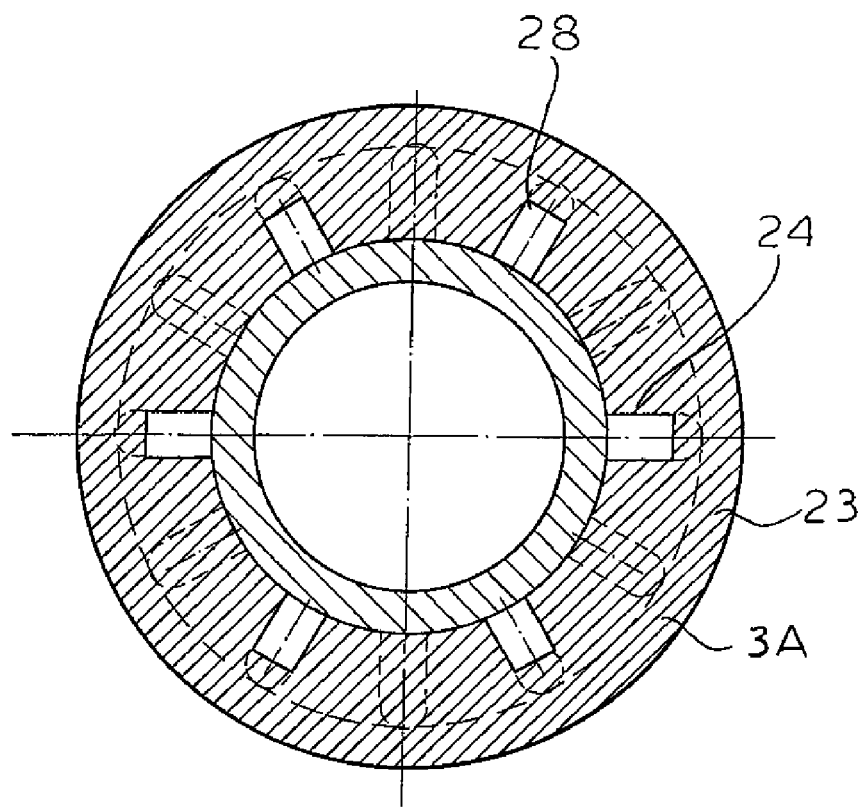
FIGS. 4 and 5 are sections along respective lines IV-IV and V-V of FIG. 1.
Figure 5:
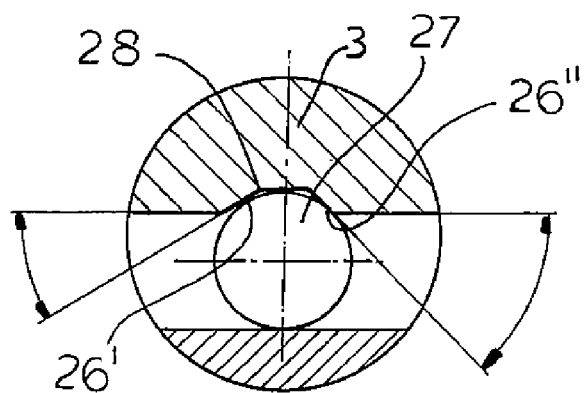

The coupling 16 is actually a torque decoupler that allows the sleeve 23 to rotate in the housing 3 when a torque is applied to the sleeve 23 that exceeds a predetermined limit. To this end the coupling 16 is comprised of a stack of spring washers 25 bearing axially outward on a washer 25' threaded to the housing 3 and fixed thereon and axially inward on an axially shiftable washer 25" bearing as shown in FIG. 4 on six cylindrical coupling bodies 27 received in radially inwardly open notches 24 of the sleeve 23. A face of the housing 3 turned axially outward toward the washer 25" is formed with six angularly equispaced and axially outwardly open seats 28 in which the cylindrical coupling bodies 27 engage partially. Each seat 28 has a pair of flat flanks 26' and 26" that form respective acute angles of 30° and 45° with a plane perpendicular to the axis 10 as shown in FIG. 5. The smaller angle is effective in the tightening direction so that more torque is available for dechucking a tool.

With this system when a torque is applied to the sleeve 8 when it is coupled to the sleeve 23 that is greater than a predetermined limit, the springs 25 will be compressed and the coupling bodies 27 will ride up and out of the seats 28, allowing the sleeve 8 and sleeve 23 to turn relative to the housing 3.

Thus assuming there is no tool in the chuck 5 and its jaws 6 are retracted outward, a tool is chucked by first fitting it between the jaw 6 and manually rotating the adjustment sleeve 8 to bring these jaws 6 into at least light radial contact with the tool. During this operation a standard spindle stop on the housing 2 can be actuated to rotationally arrest the shaft 4, although often the natural resistance of the drill's motor and transmission are enough to provide the necessary braking action.

Once the tool is thus preliminarily engaged between the jaws 6, the user releases the spindle stop and pushes in the buttons 20 to press the bumps 18 against the outside surface of the adjustment sleeve 8. The drill's motor is then briefly energized to rotate the shaft 4 in the direction necessary to further tighten the jaws 5. This action will initially rotate the chuck body 7 and sleeve 8 jointly about the axis 10 relative to the housing part 3. As soon, however, as the bumps 18 align and drop into the seats 17, further rotation of the sleeve 8 is stopped and continued rotation of the chuck body 7 will powerfully tighten the jaws 6 on the tool.

Once the tool is so solidly chucked that rotation of the chuck body 7 is resisted with the threshold torque of the delimiter 16, this delimiter 16 will release and will allow the sleeve 23 to rotate relative to the housing part 3. Such rotation will pull the buttons 20 out of engagement with the user's finger, causing the bumps 18 to move radially out of the seats 17. The result is decoupling of the sleeve 23 from the sleeve 8, so that the sleeve 8 and chuck body 7 can continue to rotate relative to the sleeve 23 and housing part 3.

To dechuck the tool, the buttons 20 are pressed in and the drill's motor is rotated oppositely. The higher threshold torque permitted by the decoupler 16 because of its steeper flanks 26' effective in this direction will allow the jaws 6 to be backed off the tool. The user will normally stop the drill's motor as soon as the tool is loose or drops out of the chuck 5, but if he or she does not, the decoupler 16 will respond and cause the sleeve 23 to rotate when the jaws 6 reach their radially outermost or axial rearmost positions, again pulling the buttons 20 out of the user's grip as described above.

Figure 6:
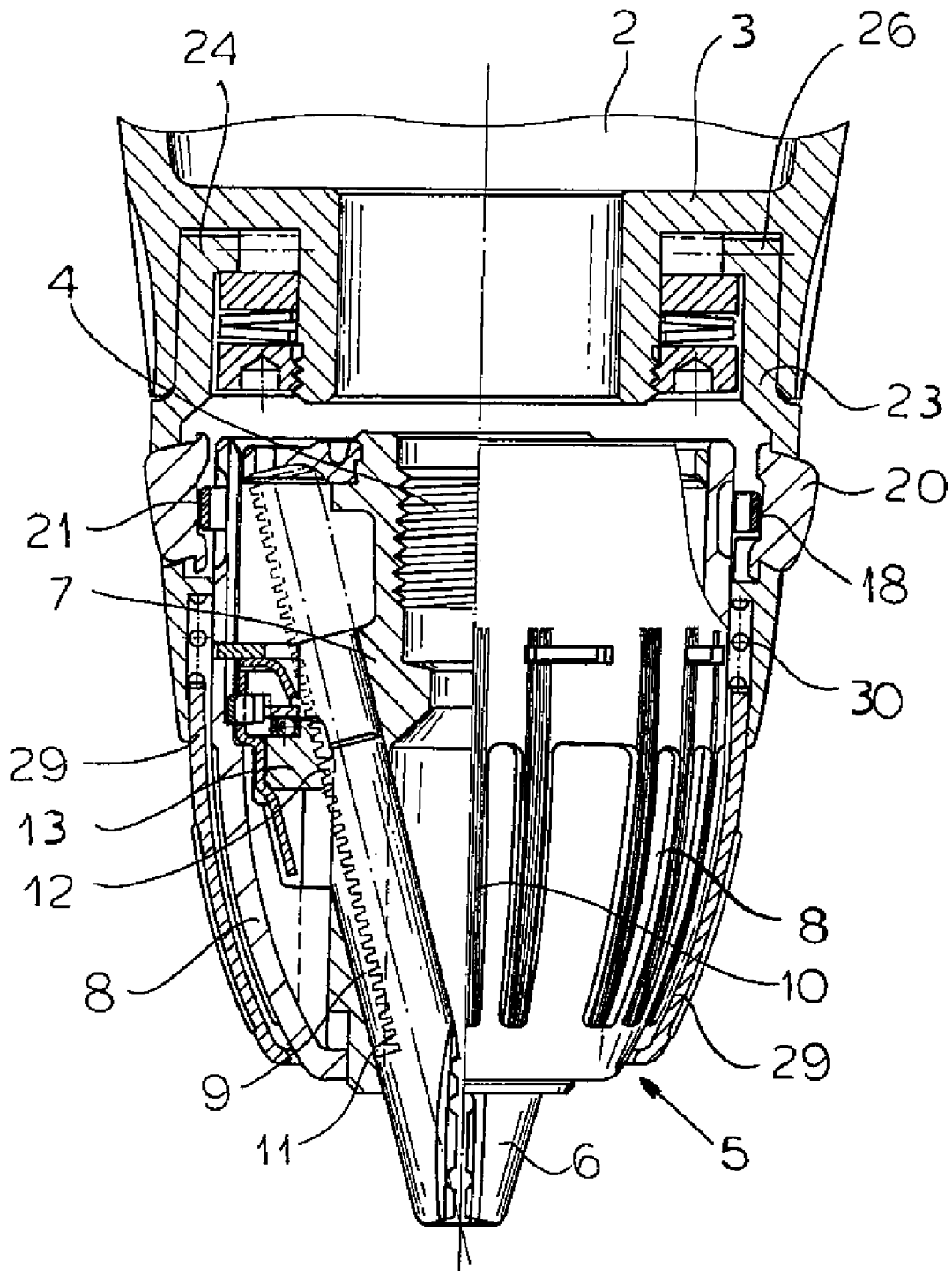
FIG. 6 is a view like FIG. 1 of another chuck in accordance with the invention.

FIG. 6 shows a substantially identical arrangement, except that a shield sleeve 29 centered on the axis and of a shape identical to that of an outer portion of the adjustment sleeve 8 closely surrounds this adjustment sleeve 8, leaving only its outer end and the outer end of the chuck body 7 exposed. A spring 30 pushes this sleeve 20 into an outer position spaced radially slightly outward of an outer surface of the sleeve 8, but allows the sleeve 29 to be pulled axially inward (up in FIG. 6) to bear on the sleeve 8 and rotationally brake and arrest it.

It is within the scope of the invention to provide a sheet-metal ring or cap that is fitted over the front end of the chuck 5, only exposing the tips of the jaws 6. This cap can be rotatable relative to the chuck body 7 and/or the adjustment sleeve 8 and can engage radially around the front end of the adjustment sleeve 8 to prevent drilling particles from getting into the chuck 5.

I claim:

1. A chuck comprising:
   a drive shaft extending along and rotatable about an axis;
   a housing part adjacent the drive shaft and generally nonrotatable about the axis;
   a chuck body fixed to and rotatable with the shaft and formed with a plurality of guides;
   respective jaws shiftable in the guides between closely spaced inner positions and widely spaced outer positions;
   an adjustment sleeve surrounding the body, coupled to the jaws, and rotatable about the axis relative to the body to shift the jaws between their positions;
   latch means including an array of seats distributed angularly about the axis and fixed relative to the adjustment sleeve and two angularly spaced radially shiftable buttons movable relative to the housing part and manually shiftable between a coupled position for rotationally locking the adjustment sleeve to the housing part and a decoupled position for rotation about the axis of the adjustment sleeve relative to the housing part;
   a single arcuate leaf spring engaged around the adjustment sleeve, bearing radially outward on both of the buttons, and urging the buttons radially outward into a position disengaged from the seats; and
   coupling means connected to the latch means for decoupling the latch means from the housing when, in the coupled position, a torque exerted between the housing and the chuck body exceeds a predetermined limit.

2. The chuck defined in claim 1 wherein the chuck body is formed with an array of angled guides each holding a respective one of the jaws, each jaw having an outer edge formed with a plurality of teeth, the adjustment sleeve including a ring having an internal screwthread meshing with the jaw teeth.

3. The chuck defined in claim 1 wherein the spring is rotationally fixed to the buttons and is formed at each button with a radially inwardly directed bump fittable in the seats and constituting the coupling formation.

4. The chuck defined in claim 1, further comprising
   a coupling sleeve carrying the buttons and surrounding the spring.

5. The chuck defined in claim 4 wherein the coupling means is connected between the coupling sleeve and the housing.

6. The chuck defined in claim 5 wherein the coupling sleeve and the housing part have axially confronting faces, the coupling means including
   a plurality of coupling bodies rotationally fixed to one of the faces;
   respective axially open seats on the other of the faces partially receiving the coupling bodies; and
   a spring urging the coupling sleeve axially toward the housing part, whereby when the predetermined torque limit is exceeded the bodies are cammed out of the respective seats and the coupling sleeve and housing part can rotate about the axis relative to each other.

7. The chuck defined in claim 6 wherein the seats have flat flanks.

8. The chuck defined in claim 7 wherein the flanks of each seat extend at different angles to a plane perpendicular to the axis, whereby the predetermined torque limit is different depending on its rotational sense.

9. The chuck defined in claim 1, further comprising
   a shield sleeve projecting axially outward from the housing and radially surrounding all but an end portion of the adjustment sleeve and chuck body.

10. The chuck defined in claim 9 wherein the shield sleeve is shiftable axially between an outer position out of contact with the adjustment sleeve and an inner position engaging the adjustment sleeve.

11. The chuck defined in claim 10, further comprising
    a spring urging the shield sleeve into the outer position.

12. The chuck defined in claim 10 wherein the shield sleeve is rotatable about the axis relative to the housing.

13. The chuck defined in claim 1, further comprising
    a coupling sleeve surrounding the adjustment sleeve and juxtaposed with the housing part, the formations of the latch means being on the coupling sleeve and on the adjustment sleeve, the coupling means being connected between the coupling sleeve and the housing part.

14. A chuck comprising:
    a drive shaft extending along and rotatable about an axis;
    a housing part adjacent the drive shaft and generally nonrotatable about the axis;
    a chuck body fixed to and rotatable with the shaft and formed with a plurality of guides;
    respective jaws shiftable in the guides between closely spaced inner positions and widely spaced outer positions;
    an adjustment sleeve surrounding the body, coupled to the jaws, and rotatable about the axis relative to the body to shift the jaws between their positions;
    latch means including an array of seats distributed angularly about the axis and fixed relative to the adjustment sleeve and two angularly spaced radially shiftable buttons movable relative to the housing part and manually shiftable between a coupled position for rotationally locking the adjustment sleeve to the housing part and a decoupled position for rotation about the axis of the adjustment sleeve relative to the housing part;
    a spring bearing radially outward on both of the buttons and urging the buttons radially outward into a position disengaged from the seats;
    a coupling sleeve carrying the buttons and surrounding the spring, the coupling sleeve and the housing part having axially confronting faces; and
    coupling means connected between the coupling sleeve and the housing and to the latch means for decoupling the latch means from the housing when, in the coupled position, a torque exerted between the housing and the chuck body exceeds a predetermined limit, the coupling means including
      a plurality of coupling bodies rotationally fixed to one of the faces,
      respective axially open seats on the other of the faces partially receiving the coupling bodies and having flat flanks that extend at different angles to a plane perpendicular to the axis, and
      a spring urging the coupling sleeve axially toward the housing part, whereby when the predetermined torque limit is exceeded the bodies are cammed out of the respective seats and the coupling sleeve and housing part can rotate about the axis relative to each other and the predetermined torque limit is different depending on its rotational sense.

* * * * *